United States Patent [19]

Finlayson

[11] Patent Number: 4,975,138

[45] Date of Patent: Dec. 4, 1990

[54] METHOD FOR COATING FORMED METAL OBJECTS AND PRODUCTS FORMED THEREBY

[75] Inventor: Steven E. Finlayson, Granville, Ohio

[73] Assignee: The Dow Chemical Company, Midland, Mich.

[21] Appl. No.: 383,305

[22] Filed: Jul. 18, 1989

Related U.S. Application Data

[63] Continuation of Ser. No. 882,862, Jul. 7, 1986, abandoned.

[51] Int. Cl.$^5$ .............................................. B21D 35/00
[52] U.S. Cl. .................................. 156/245; 79/469.5; 156/307.7; 156/313; 264/257
[58] Field of Search ............ 156/221, 224, 245, 306.6, 156/307, 7, 313, 209, 219, 220, 309.9, 194; 29/469.5; 264/257, 258; 428/489, 36, 246, 253

[56] References Cited

U.S. PATENT DOCUMENTS

| | | | |
|---|---|---|---|
| 1,973,193 | 9/1934 | Young et al. | 428/444 |
| 2,073,334 | 3/1937 | Coffman | 428/608 |
| 2,173,815 | 9/1939 | Slisz et al. | 156/206 |
| 2,472,100 | 6/1949 | Fair, Jr. | 428/467 |
| 2,532,442 | 12/1950 | Daly | 156/224 X |
| 2,640,501 | 6/1953 | Scott et al. | 156/195 |
| 2,732,886 | 1/1956 | Andreoli et al. | 156/206 |
| 3,757,829 | 9/1973 | Berry et al. | 156/187 |
| 3,788,931 | 1/1974 | Hynes | 156/245 X |
| 3,813,280 | 5/1974 | Olszyk et al. | 156/278 |
| 3,960,639 | 6/1976 | Kudo | 29/469.5 X |
| 4,091,134 | 5/1978 | Uemura et al. | 138/145 |
| 4,158,371 | 6/1979 | Reusser et al. | 138/145 |
| 4,269,234 | 5/1981 | Johnson et al. | 138/145 |
| 4,337,218 | 6/1982 | Byrd et al. | 156/91 |
| 4,500,577 | 2/1985 | Satake et al. | 138/145 |
| 4,912,697 | 3/1980 | Parker et al. | 156/188 |

FOREIGN PATENT DOCUMENTS 1183031 3/1970 United Kingdom ................ 156/221

OTHER PUBLICATIONS

The Dow Chemical Company, "Dow Adhesive Films", Copyright 1978.

*Primary Examiner*—David Simmons

[57] ABSTRACT

A method is disclosed for forming a coated metal object comprises preparing a laminate of an unformed metal substrate and a fabric having a thermoplastic adhesive layer interposed between and adhered to the metal substrate and fabric; forming the laminate into the desired metal object; and coating the formed metal object with a suitable coating material.

15 Claims, No Drawings

METHOD FOR COATING FORMED METAL OBJECTS AND PRODUCTS FORMED THEREBY

CROSS REFERENCE TO RELATED APPLICATION

This is a continuation of application Ser. No. 882,862 filed July, 7, 1986.

BACKGROUND OF THE INVENTION

The present invention relates to coated formed metal objects such as corrugated steel pipe containing either outer coatings, inner coatings, or both outer and inner coatings of protective substances such as asphalt or cementitious coatings, building panels or roofing panels similarly shaped or formed and coated as well as machine housings or equipment casings having sound proofing or abrasion resistant or corrosion resistant coatings applied thereto. More particularly, the present invention relates to such previously described structures, referred to hereinafter as "formed metal structures", having improved integrity between the surface coatings applied thereto and the underlying metallic substrates.

In U.S. Pat. No. 4,192,697, a method for forming an adherent protective coating on articles, particularly pipes, comprising wrapping the pipe with a hot impregnated fabric strip, preferably a glass fiber strip impregnated with hot, molten adhesive and over-wrapping the same with a polyvinyl chloride sheet is disclosed.

In U.S. Pat. No. 4,158,371, a coating composition providing good crack resistance comprising 50 to 70 weight percent of a mineral aggregate, about 15 to 35 weight percent of finely divided mineral filler, about 5 to 20 weight percent asphalt and about 0.05 to 7 weight percent of a rubbery radial teleblock copolymer, about 0 to 7 percent of an oil and about 0 to 0.5 weight percent of a fibrous material is disclosed. The composition may be applied in a molten state to a substrate such as a steel pipe after first priming the surface thereof with an asphalt composition.

In Japanese Publication J 59-083,616, an asphalt coating sheet comprising a heat resistant vinylon cloth laminated with blown asphalt is disclosed for wrapping about steel pipes. A similar bitumen based tape is disclosed in East German laid open publication DL-139,634, wherein glass fiber is impregnated and coated on both sides with a bitumen composition and one side thereof is further coated with an adhesive while the other side is coated with a polyethylene film. The tape is then applied to structural steel components to protect against corrosion.

In DT 2,829,387, a thermoplastic coated, lining material comprising a base layer of a woven or knitted fabric, a thermoplastic layer on one side and a fiber pile layer on the opposite side is disclosed. The fiber pile surface is employed for attaching a reinforcing material such as concrete.

The above described previously known processes for providing protective coatings to formed metal articles have proven deficient for one or more reasons. In general, attempting to apply a tape or fabric to a already formed metal article is extremely limited in practice. Only articles of generally a smooth uniform surface such as round pipes may be satisfactorily coated employing preformed tapes. Odd shaped objects, metal objects having corners or edges, and the internal surfaces of formed metal objects often cannot be coated or adequately protected by this or other previously known techniques.

Moreover, the adhesive bond between a metal surface and in particular, a bitumen or asphalt based adhesive has been found to be insufficient to provide satisfactory long term adhesion.

It would be desirable to provide coated metal objects having improved adhesion between the metal surface and the coating applied thereto.

It would further be desirable to provide coated metal articles having any desired shape or form, and when defining both internal or external surfaces, casted on either or both of such surfaces. Finally, it would be desirable to provide an improved method for providing bitumen or asphalt coated formed metal objects.

SUMMARY OF THE INVENTION

According to the present invention there is now provided a method for forming a coated metal object, the steps of the method comprising: (a) preparing a laminate comprising an unformed metal substrate and a fabric having a thermoplastic adhesive layer disposed between and adhered to the metal substrate and fabric; (b) forming the laminate into the desired shape in a manner such that adhesion between the metal substrate, adhesive layer and fabric is retained; and (c) coating the metal object on at least one surface thereof with a coating material.

In a further embodiment of the present invention, there is provided a coated metal object prepared according to the above technique.

DETAILED DESCRIPTION OF THE INVENTION

While any metal object may be coated and protected according to the present invention, particularly desired metals include steel, aluminum, copper, or other suitable metal. The metals may be coated or treated by any suitable technique such as primer treatment, electrochemical deposition, metal plating, chromating, alloy coating, anodizing, etc. Specific examples include galvanized, aluminized, and Gavalum ® brand alloy coated metals. Suitably, the metal is a sheet metal having a thickness of about 0.1 to about 10 millimeters which may be formed by standard cold forming or drawing techniques.

The fabric which is applied to the unformed metal substrate suitably comprises any woven, knitted, or nonwoven fabric. Examples include fabrics of natural fibers such as cotton, wool, rayon, cellulose, etc., synthetic polymeric fibers such as aramide, polyester, polypropylene, saran, polystyrene, polyamide, acrylic, or modacrylic, and inorganic fibers such as fiber glass, carbon, steel, aluminum, stainless steel, ceramic, alumina, etc. prepared by any suitable weaving, stitching, tufting, bonding, spun bonding, or needling technique. A preferred fabric is a nonwoven polyester, wherein the pile is produced by needle-puncture.

It is possible, according to the present invention, to prepare the laminate by any suitable technique. For example, the thermoplastic adhesive layer may first be deposited upon a metal substrate and subsequently the fabric adhered thereto, as for example, by contacting with the adhesive layer while in a molten or semi-molten state. Alternatively, the fabric and thermoplastic adhesive may be first contacted to prepare a two layered-composite according to known techniques. The metal may then be contacted with a separately prepared thermoplastic adhesive layer/fabric composite under suitable conditions to prepare the resulting laminate. As will be apparent to the skilled artisan, the laminate may also be prepared in a single process by contacting the metal substrate thermoplastic adhesive and fabric essentially simultaneously in one optionally continuous process. Suitable conditions of pressure and temperature may be easily determined by the skilled artisan. A continuous process employing niprolls, pinchrolls, etc., is especially desirable.

The selection of a suitable thermoplastic adhesive may depend upon the desired substrate and fabric employed. Preferred thermoplastic adhesives comprise interpolymers of ethylene and at least one copolymerizable comonomer containing carboxyl functionality and further derivatives thereof and anhydride modified polyolefins. Examples include interpolymers of ethylene with from about 1.0 to 50.0 percent by weight of ethylenically unsaturated carboxylic acids such as acrylic or methacrylic acid as well as $C_{1-4}$ alkyl esters thereof; homopolymers and interpolymers of ethylene including the above described interpolymers modified by reaction with a reactive carboxylic anhydride; and copolymers of ethylene and carbon monoxide. A particularly preferred adhesive layer comprises a copolymer of ethylene and acrylic acid, particularly a substantially homogeneous copolymer of ethylene and acrylic acid containing up to about 10 percent by weight acrylic acid.

The metal substrate may be laminated on one or both sides depending on the desired end use. After application of the fabric layer, the metal object is formed into the desired shape. Most preferably, the metal is in the form of a sheet and the laminated surface does not affect the subsequent corrugating, bending, drawing, or forming operations. In addition, such forming operations do not affect the integrity of the laminated surface due to the flexibility, elasticity and adhesion of the thermoplastic adhesive.

The coating materials are those compositions that are suitably adherable to the fabric surface. Examples include resinous materials, e.g. bitumen or asphalt compositions including those comprising additional materials such as mineral aggregates, rubbery copolymers such as block copolymers, plasticizers, or oils, and fibrous fillers; natural or synthetic lacquers, paints or varnishes, plastisol; reactive resin forming materials, such epoxies, polyesters, polyurethanes, etc. If desired, additional materials such as fillers, particulated solids, etc. may be incorporated in these coatings to give the surface desired properties such as abrasion resistance, skid resistance, or texture. Additional, suitable coatings include those comprising portland cement and other cementitious coatings, e.g., concrete, plaster, etc. Preferably, the coating material comprises a bitumen or asphalt material applied as a hot melt by dipping the completed formed metal object into the molten coating material or alternatively by spraying the coating thereon.

Not only may the coating be bonded by adhesion to the fabric and by penetration there through to the underlying thermoplastic adhesive layer, but the nature of the fabric allows physical attachment to the rough surface.

As may be seen, the present method allows application of the coating to a formed metal object so as to provide improved adhesion regardless of the shape or size of the object being so coated. In addition, the coating may be easily applied to all surfaces of the metal object including the inner surfaces, if such surfaces exist, which previously have been incapable of coating by the use of tapes or other coating materials. Moreover, by applying the thermoplastic adhesive layer to the metal before application of the coating improved integrity between the metal and the coating composition is obtained.

SPECIFIC EMBODIMENTS

Having described the invention, the following examples are provided as further illustrative and are not to be construed as limiting.

EXAMPLE 1

A polyester, needlepunched, nonwoven fabric is bonded to a thin film of extruded, blown ethylene/acrylic acid copolymer approximately 0.3 mm thick (DAF 899, available from The Dow Chemical Company) by contacting the two surfaces at about 150° C. under pressure applied by a nip roller. A sheet of galvanized steel approximately 2 mm in thickness surface treated with a chromatic coating is heated to 200° C. and the adhesive film/fabric laminate is contacted to both sides thereof in separate laminating operations. The resulting coated sheet steel is corrugated and rolled into a pipe having a diameter of approximately 12 inches (305 mm) and length of 8 ft. (2.5 m). The pipe is then immersed in molten asphalt (175° C.) removed, and excess asphalt is allowed to drain. After solidification and cooling, the resulting product has a surface coating of asphalt securely held in place by the underlying bonded fabric layer.

What is claimed is:

1. A method for forming a coated metal object comprising:
   (a) preparing a laminate comprising an unformed metal substrate and an uncoated fabric having a thermoplastic adhesive layer disposed between and adhered to the metal substrate and fabric;
   (b) forming the laminate into the desired shape in a manner such that adhesion between the metal substrate, adhesive layer and fabric is retained; and
   (c) coating the metal object on at least one surface thereof with a coating material.

2. A method according to claim 1, wherein the metal is steel.

3. A method according to claim 2, wherein the metal substrate is sheet steel of from about 0.1 to 10 mm thickness.

4. A method according to claim 3, wherein the sheet steel is laminated on both sides with the adhesive layer and fabric.

5. A method according to claim 1 or 3, wherein the fabric is woven, knitted or nonwoven.

6. A method according to claim 5, wherein the fabric comprises a natural fiber, a synthetic polymeric fiber or an inorganic fiber.

7. A method according to claim 5, wherein the adhesive layer comprises an interpolymer of ethylene and at least one carboxyl containing copolymerizable comonomer.

8. A method according to claim 5, wherein the adhesive layer comprises a substantially homogeneous copolymer of ethylene and acrylic acid containing up to about 10 percent by weight acrylic acid.

9. A method according to claim 5, wherein the coating material comprises a resinous or a cementitious coating material.

10. A method according to claim 9, wherein the coating material comprises bitumen or asphalt.

11. A method according to claim 10, wherein the coating material is applied as a hot melt.

12. A method for forming a coated corrugated metal pipe comprising:
   (a) preparing a laminate comprising a sheet metal substrate laminated on at least a majority of the exposed surface of one or both sides thereof with an uncoated fabric having a thermoplastic adhesive resin interposed between the substrate and the fabric;
   (b) forming the laminate of step (a) into a corrugated pipe;
   (c) contacting one or both surfaces of the so formed corrugated pipe with an adherable coating material.

13. A method according to claim 12, wherein the coating material comprises bitumen or asphalt.

14. A method according to claim 12, wherein the thermoplastic adhesive is a copolymer of ethylene and acrylic acid.

15. A coated metal object prepared according to the method of claim 1, 3 or 12.

* * * * *